United States Patent
Katchmart

(10) Patent No.: US 11,087,788 B1
(45) Date of Patent: Aug. 10, 2021

(54) UNIFIED TIME BASE FOR SELF-SERVO-WRITE OPERATION

(71) Applicant: Marvell Asia Pte, Ltd., Singapore (SG)

(72) Inventor: Supaket Katchmart, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/946,501

(22) Filed: Jun. 24, 2020

Related U.S. Application Data

(60) Provisional application No. 62/866,466, filed on Jun. 25, 2019, provisional application No. 62/869,906, filed on Jul. 2, 2019.

(51) Int. Cl.
*G11B 5/596* (2006.01)
*G11B 20/10* (2006.01)

(52) U.S. Cl.
CPC ...... *G11B 5/59666* (2013.01); *G11B 5/59661* (2013.01); *G11B 20/10231* (2013.01)

(58) Field of Classification Search
CPC .......................... G11B 21/02; G11B 5/59666
See application file for complete search history.

(56) References Cited

U.S. PATENT DOCUMENTS

| | | | | |
|---|---|---|---|---|
| 7,167,333 B1 * | 1/2007 | Liikanen | G11B 5/5526 | 360/48 |
| 7,230,789 B1 * | 6/2007 | Brunnett | G11B 5/59633 | 360/75 |
| 7,580,216 B1 * | 8/2009 | Han | G11B 5/59644 | 360/39 |
| 7,619,846 B2 * | 11/2009 | Shepherd | G11B 5/59644 | 360/75 |
| 7,688,539 B1 * | 3/2010 | Bryant | G11B 5/59661 | 360/75 |
| 8,077,422 B1 * | 12/2011 | Ton-That | G11B 5/59661 | 360/75 |
| 8,634,283 B1 * | 1/2014 | Rigney | G11B 5/59666 | 369/44.28 |
| 8,687,308 B1 * | 4/2014 | Katchmart | G11B 5/59661 | 360/55 |
| 9,245,560 B1 * | 1/2016 | Nie | G11B 5/59666 | |

OTHER PUBLICATIONS

Katchmart U.S. Appl. No. 16/715,599, filed Dec. 16, 2019.
Katchmart U.S. Appl. No. 16/812,960, filed Mar. 9, 2020.

* cited by examiner

*Primary Examiner* — K. Wong

(57) ABSTRACT

Storage device self-servo-write includes generating a time base frequency signal, generating a sampled frequency signal by sampling the time base frequency signal at a sample rate to obtain a first set of samples, decimating those samples at a decimation rate to obtain a second set of samples at a spiral frequency of which the time base frequency is a first integer multiple, detecting a spiral track based on the spiral frequency, and writing a servo pattern based on the spiral track and the time base frequency. A generated sampled frequency obtained by sampling the time base frequency signal at the sample rate is used as the servo write frequency, of which the time base frequency is a second integer multiple. Alternatively, the time base frequency is multiplied by a first rational multiple so that the time base frequency is a second rational multiple of the servo write frequency.

20 Claims, 8 Drawing Sheets

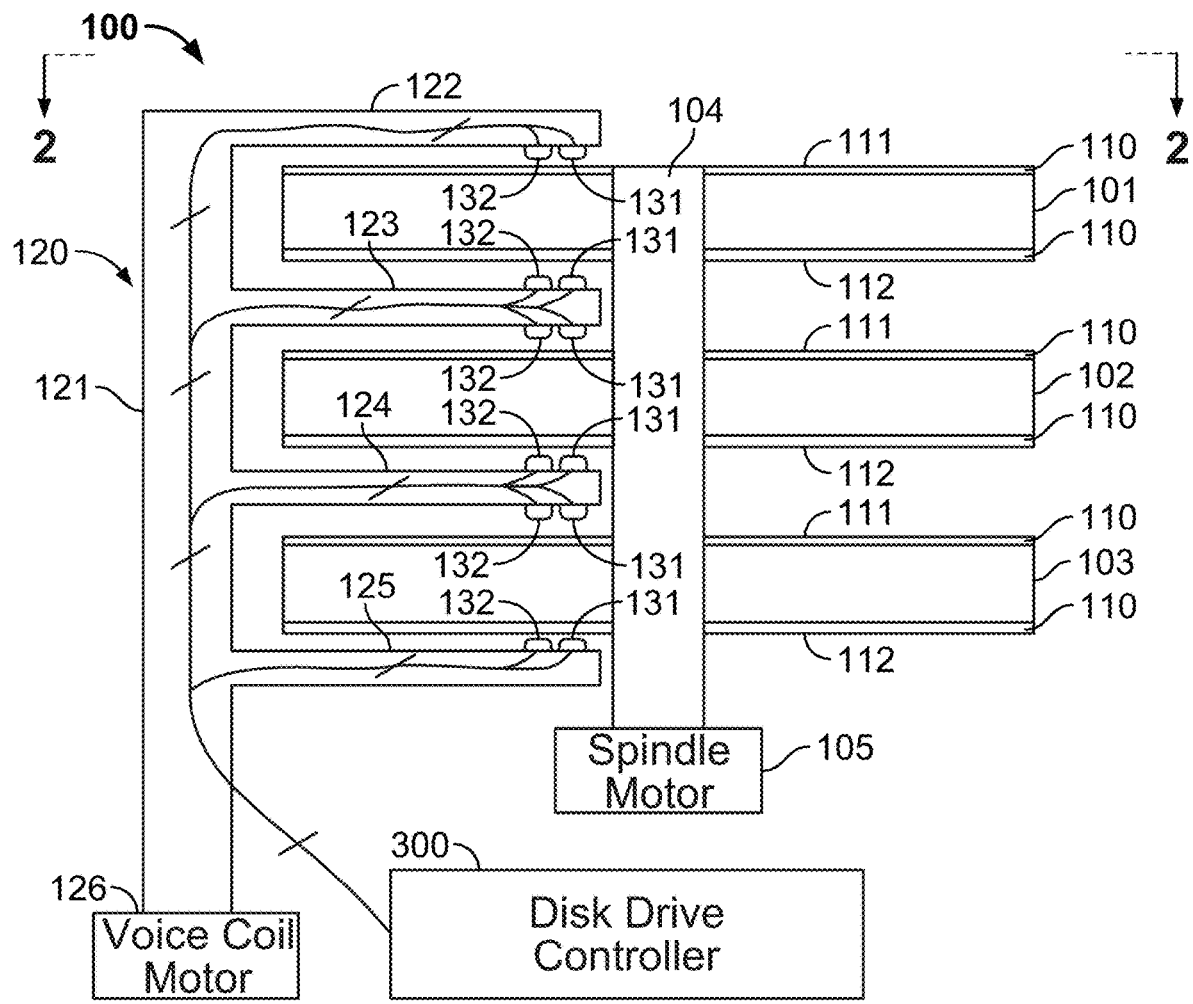
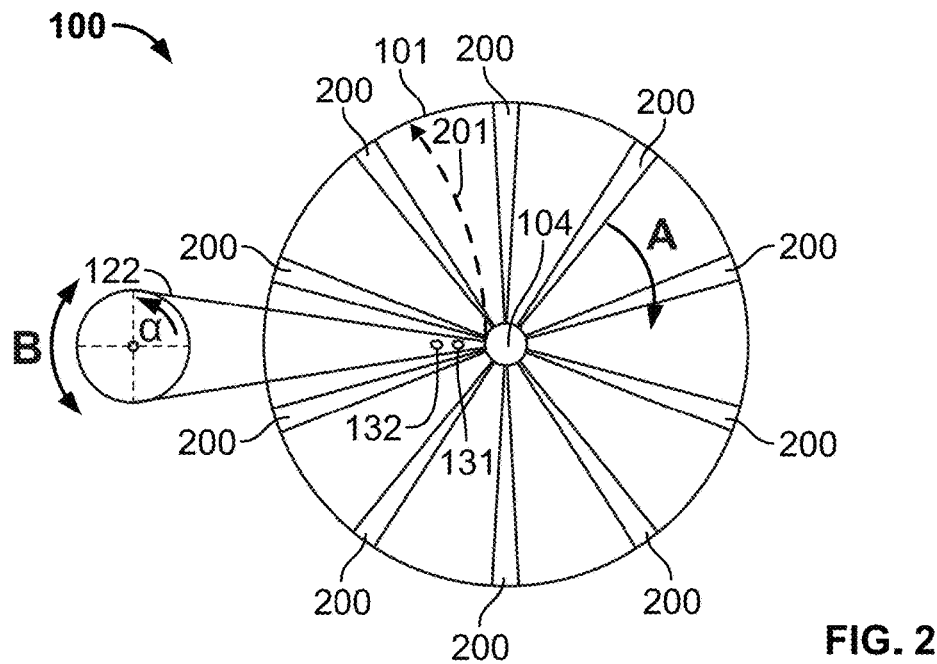
FIG. 1
FIG. 2

UNIFIED TIME BASE FOR SELF-SERVO-WRITE OPERATION

CROSS REFERENCE TO RELATED APPLICATION

This disclosure claims the benefit of commonly-assigned U.S. Provisional Patent Applications No. 62/866,466, filed Jun. 25, 2019, and 62/869,906, filed Jul. 2, 2019, each of which is hereby incorporated by reference herein in its respective entirety.

FIELD OF USE

This disclosure relates to self-servo-write operations in storage devices such as disk drives. More particularly, this disclosure relates to provision of a unified time base for self-servo-write operations in disk drives.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Magnetic disk drives, for example, include a one or more individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation.

Servo wedge information typically is recorded on a storage medium at the time of manufacture. One technique for recording servo wedge information is "self-servo write" ("SSW"), in which the storage device's own read/write mechanisms, including data channel controllers and read/write heads, are used to write the servo wedge information, possibly under control of an external processor.

Self-servo-write operations typically begin with writing of initial or "coarse" reference spirals. The coarse reference spirals are sets of time data written in highly ramped spirals between the outer and inner diameter of the disk by sweeping the disk read/write head radially at a relatively high rate as the disk rotates. The coarse reference spirals may not be regularly or evenly spaced. After coarse reference spirals have been written, the read/write mechanism reads and "learns" the locations of the coarse reference spirals. The coarse reference spiral locations are then referenced to allow the writing of more refined location data as "intermediate" reference spirals. The intermediate reference spirals are less ramped than the coarse spirals and contain more precise time data. After the intermediate spirals have been written, the read/write mechanism reads and "learns" the locations of the intermediate spirals. From this finer location data, the read/write mechanism writes final servo control signal patterns as "servo wedges" along concentric arcs at varying radii (i.e., in tracks).

The quality of the spiral data and the servo wedge data is affected by the frequency at which the spiral data and the servo wedge data are processed. In typical implementations, both the spiral data and the servo wedge data are processed at frequencies derived from a common reference frequency, but using separate time base generators.

SUMMARY

According to implementations of the subject matter of this disclosure, a self-servo-write method in a storage device includes generating a time base frequency signal, generating a sampled frequency signal by sampling the time base frequency signal at a sample rate to obtain a first set of samples, decimating the first set of samples at a decimation rate to obtain a second set of samples at a spiral frequency that is lower than the time base frequency, the time base frequency being a first integer multiple of the spiral frequency, detecting a spiral track based on the spiral frequency, and writing a servo pattern based on the detected spiral track and the time base frequency.

In a first implementation of such a method, the writing the servo pattern may include writing the servo pattern based on the detected spiral track and a servo write frequency derived from the time base frequency.

In a first instance of that first implementation, which may include using the generated sampled frequency obtained by the sampling the time base frequency signal at the sample rate as the servo write frequency, the time base frequency may be a second integer multiple of the servo write frequency.

That first instance of the first implementation may include selecting the sample rate and the decimation rate such that the first integer multiple is larger than the second integer multiple.

A second instance of the first implementation may further include deriving the servo write frequency from the time base frequency by multiplying the time base frequency by a first rational multiple, and sampling, at the sample rate, a signal having the multiplied time base frequency, and in that second instance, the time base frequency may be a second rational multiple of the servo write frequency.

That second instance may include selecting the sample rate, the decimation rate and the first rational multiple such that the first integer multiple is larger than the second rational multiple.

In a second implementation of such a method, the detecting the spiral track may include filtering the second set of samples to yield magnitude data, and angle data including a phase angle portion and a sync mark detect portion, and delaying the sync mark detect portion to compensate for the decimating.

In an instance of that second implementation, the delaying the sync mark detect portion may include using an integer part of the angle data to generate a delay of the sync mark detect portion.

A variant of that instance may further include delaying the angle portion to maintain synchronization with the sync mark portion.

In that variant, the delaying the angle portion may include using a fractional part of the angle data to generate a delay of the angle portion.

According to implementations of the subject matter of this disclosure, a storage device includes a storage medium on which servo data is written using a self-servo-write method, and circuitry for performing the self-servo-write method. The circuitry includes a time base frequency signal generator, sampling circuitry configured to generate a sampled frequency by sampling output of the time base frequency signal generator at a sample rate to obtain a first set of samples, a first filter configured to decimate the first set of samples at a decimation rate to obtain a second set of samples at a spiral frequency that is lower than the time base frequency, the time base frequency being a first integer multiple of the spiral frequency, spiral detector circuitry configured to detect a spiral track based on the spiral frequency, and a write pattern generator configured to write a servo pattern based on the detected spiral track and the time base frequency.

In a first implementation of such a storage device, the write pattern generator may be configured to write the servo pattern based on the detected spiral track and a servo write frequency derived from the time base frequency.

In an instance of that first implementation, the write pattern generator may be configured to generate the servo write frequency at the sampled frequency obtained by the sampling circuitry sampling the time base frequency at the sample rate, and the time base frequency may be a second integer multiple of the servo write frequency.

In such an instance, the sampling rate at which the sampling circuitry is configured to sample the output of the time base generator, and the decimation rate at which the first filter is configured to decimate the first set of samples, are configured such that the first integer multiple is larger than the second integer multiple.

In a second instance of the first implementation, in which the write pattern generator may be configured to derive the servo write frequency from the time base frequency by multiplying the time base frequency by a first rational multiple and sampling the multiplied time base frequency at the sample rate, the time base frequency may be a second rational multiple of the servo write frequency.

In that second instance, the sampling rate at which the sampling circuitry is configured to sample the output of the time base generator, the decimation rate at which the first filter is configured to decimate the first set of samples, and the first rational multiple with which the write pattern generator is configured to multiply by the time base frequency, may be configured such that the first integer multiple is larger than the second rational multiple.

In a second implementation of such a storage device, the spiral detector circuitry may include a second filter configured to derive, from the second set of samples, magnitude data, and angle data including an angle portion and a sync mark detect portion, and first delay circuitry configured to delay the sync mark detect portion to compensate for decimation of the first set of samples by the first filter.

In an instance of such an implementation, the first delay circuitry may be configured to delay the sync mark detect portion by an amount derived from an integer part of the angle data.

A variant of such an instance may further include second delay circuitry configured to delay the angle portion to maintain synchronization with the sync mark portion.

In such a variant, the second delay circuitry may be configured to delay the angle portion by an amount derived from a fractional part of the angle data.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIGS. 1 and 2 show an example of a disk drive 100 with which the subject matter of the present disclosure may be used;

DETAILED DESCRIPTION

Figure 3:
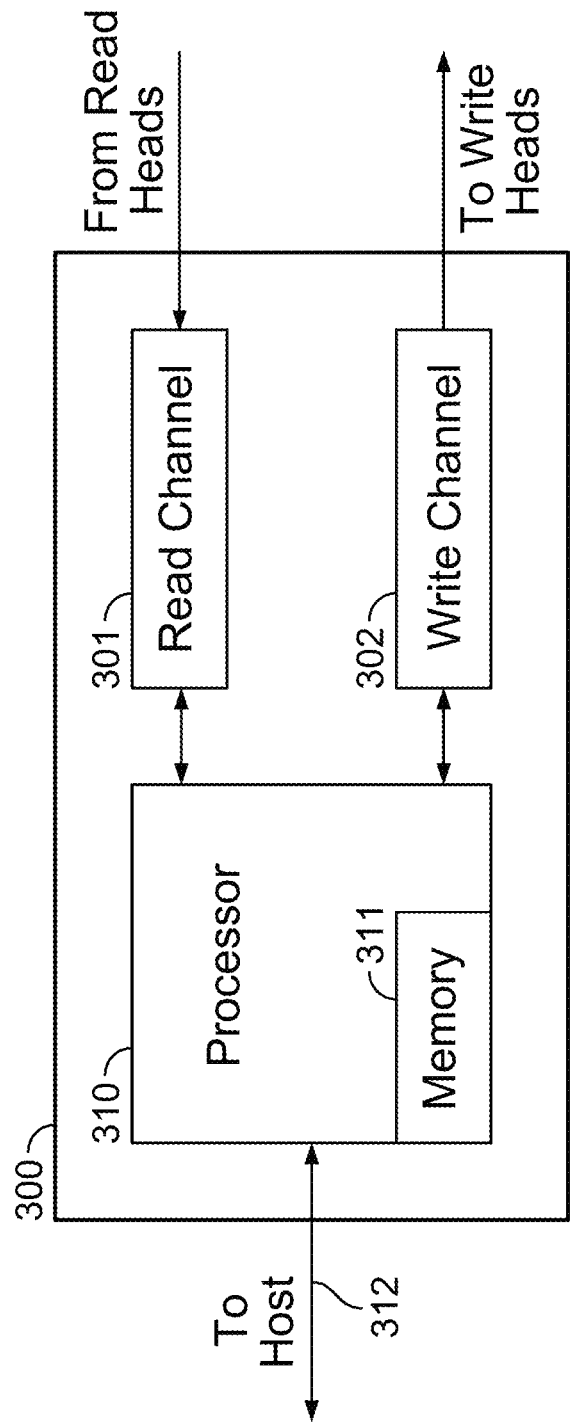
FIG. 3 is a diagram of a hard drive controller that may be used in a disk drive as in FIGS. 1 and 2 in implementations of the subject matter of this disclosure.

As described above, the quality of the spiral data and the servo wedge data is affected by the frequency at which the spiral data and the servo wedge data are processed. In typical implementations, both the spiral data and the servo wedge data are processed at frequencies derived from a common reference frequency, but using separate time base generators. The use of separate time bases provides a source of jitter in the system that may affect the quality of the servo wedge data, although there may be other sources of jitter as well.

In accordance with implementations of the subject matter of this disclosure, the quality of the servo wedge data is improved through reduction of jitter in the self-servo-write process, by using a single unified time base to generate the frequencies for both detection of the spiral data and writing of the servo wedge data. Because the spiral detection frequency (i.e., the frequency at which the spiral data is sampled) is typically lower than the servo write frequency, in accordance with implementations of the subject matter of this disclosure the unified time base may provide a time base signal with a frequency at (or above) the servo write frequency. The time base signal is typically processed in the digital domain, and in accordance with implementations of the subject matter of this disclosure the digitized time base samples may be decimated to derive the lower spiral read frequency.

The subject matter of this disclosure may be better understood by reference to FIGS. 1-9.

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It is noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104.

Each of read heads 131, 132 is connected to a read channel 301 of a hard drive controller 300 (there is a corresponding write channel 302) (FIG. 3). Hard drive controller 300 also includes a processor 310 and memory 311, as well as a connection 312 to a host processor (not shown). During normal disk operation, memory 311 may be used to store position error sensor (PES) data that indicates track position offsets. A servo control loop in hard drive controller 300 uses the PES data and the servo wedge data to keep the heads 131, 132 on track.

As explained in more detail in copending, commonly-assigned U.S. patent application Ser. No. 16/715,559, filed Dec. 16, 2019, which is hereby incorporated by reference herein in its entirety, and as shown schematically in FIG. 4, during self-servo-write operations, once a spiral has previously been written, the spiral data is read by one of read heads 131, 132 and processed through read channel 301 to provide spiral signal 401. Spiral signal 401 is digitized by analog-to-digital converter (ADC) 402 to provide spiral samples 403. Spiral detection circuitry 404 processes spiral samples 403 to yield sync-mark-found and phase angle delay signals, as described in more detail below, which control write channel 302 to determine when servo write pattern generator 405 writes the servo pattern data (WRTP/M) 406, which may be frequency-modified, to the servo wedges.

Figure 4:
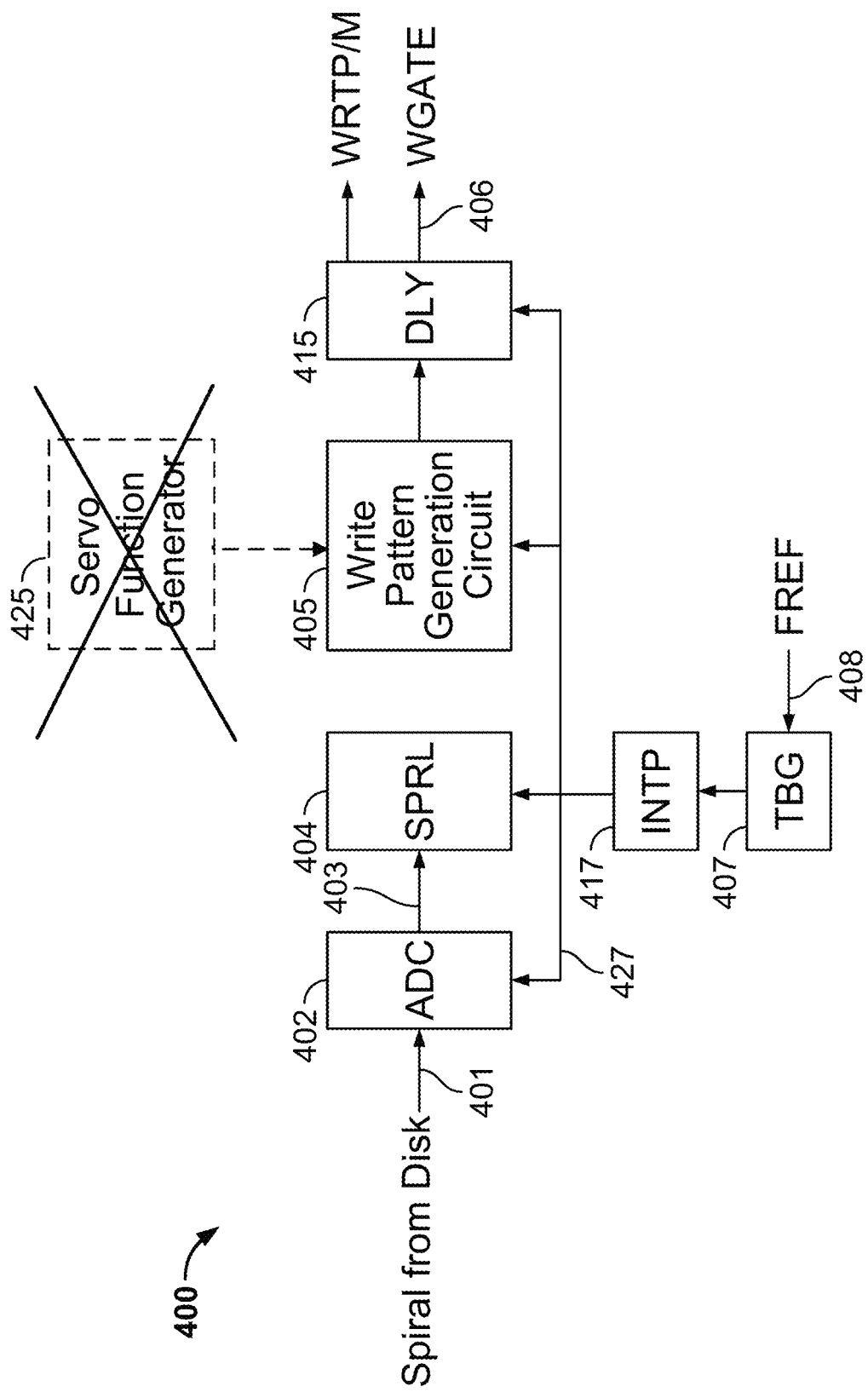
FIG. 4 is a diagram of self-servo-write circuitry in accordance with implementations of the subject matter of this disclosure.
Figure 5:
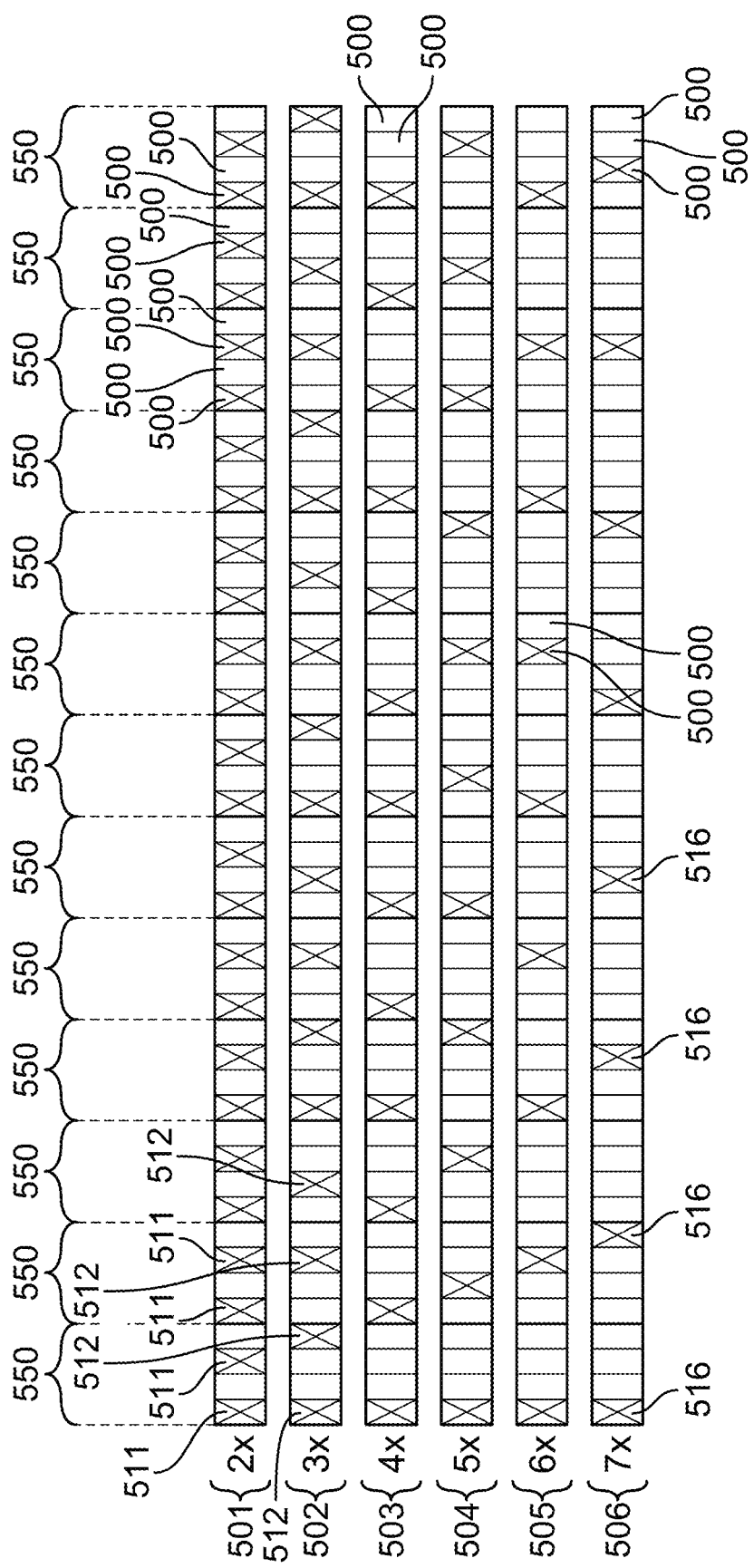
FIG. 5 is a diagram showing the alignment of decimated samples with a servo wedge counter.

As seen in FIG. 4, both spiral processing in ADC 402 and spiral detection circuitry 404, and write pattern generation in servo write pattern generator 405 (which includes an intrinsic delay represented at 415), are clocked by a signal 427 generated by time base generator 407 (which may be based on a phase-locked loop), which may be interpolated by interpolator 417, based on incoming reference frequency signal 408. Separate servo function generator 425, as was previously used to generate a clock signal for servo write pattern generation, is not needed or provided. Using the same time base generator 407 for both spiral detection and servo write pattern generation eliminates a source of jitter in the self-servo-write system, as compared to systems in which separate time base generators are used for spiral detection and servo write pattern generation.

Spiral detection and servo write pattern generation typically operate at different frequencies, with servo write pattern generation operating at a higher frequency than spiral detection. In order to accommodate the use of single time base generator 407 for both spiral detection and servo write pattern generation, the frequency signal output by time base generator 407 has a frequency at least equal to the higher frequency needed by servo write pattern generator 405.

The relationship of the frequency of the signal output by time base generator 407, to the frequencies needed by spiral detection circuitry 404 and by servo write pattern generator 405, is a function of the sample rate used by circuitry 400. By comparison, in a typical implementation, spiral detection may be performed with a spiral burst frequency of 100 MHz, while servo write operations may be performed at 200 MHz. Because analog-to-digital converter 402 typically oversamples by a factor of 4 (i.e., four samples are taken per period of the sampled signal), a time base frequency of 400 MHz typically would be provided for spiral detection, while a time base frequency of 800 MHz typically would be provided for servo write operations, to achieve the desired frequencies.

In accordance with implementations of the subject matter of this disclosure, a single common time base of at least 800 MHz may be provided. At an oversampling factor of 4, a 200 MHz servo write frequency may be derived. To derive the spiral burst frequency for spiral detection, digitized samples 403 of spiral signal 401, sampled based on time base frequency signal 427, are decimated to decrease the number of samples, which may then, again, be oversampled by a factor of 4 Hz. Thus, to derive a 100 MHz spiral burst frequency from an 800 MHz time base frequency signal 427, digital samples 403 clocked by time base frequency signal 427 may be decimated by a factor of 2, and then oversampled by a factor of 4, to yield the desired 100 MHz spiral burst frequency.

In the implementation just described, the ratio of the target servo write frequency to the target spiral burst frequency was an integer (200 MHz/100 MHz=2), which was accommodated by decimation. In other implementations of the subject matter of this disclosure, a non-integer ratio of the target servo write frequency to the target spiral burst frequency may be accommodated, by using decimation in combination with synchronous write pattern frequency modification—i.e., the ability of servo write pattern generator 405 to write at a frequency that is a rational, non-integer multiple of the time base frequency, as described in above-incorporated application Ser. No. 16/715,559.

For example, one such implementation may employ a spiral burst frequency of 100 MHz and a servo write frequency of 250 MHz. Those frequencies may be achieved by providing a 1200 MHz (i.e., 1.2 GHz) time base frequency for clocking samples 403. For spiral detection, decimation by 3 yields a 400 MHz signal, which, oversampled by a factor of 4, provides a 100 MHz spiral burst frequency. For servo pattern generation, using synchronous write pattern frequency modification in servo write pattern generator 405, at a frequency step of 1000/1200, yields a 1000 MHz (i.e., 1 GHz) signal, which, oversampled by a factor of 4, provides a 250 MHz servo write frequency.

In order to accommodate the necessary sample rates for decimation, the resolution of spiral detector 404 may have to be increased. For example, to support a resolution of $1/128^{th}$ of a time base generator period, or $T_{TBG}/128$ (which is equivalent to $1/512^{th}$ of a wedge counter, or WCNTR/512), would require a spiral phase detection resolution of $1/512^{th}$ of a spiral pattern period in the absence of decimation. However, higher decimation rates would require better resolution. For example, decimation-by-2 would require a resolution of $1/1024^{th}$ of a spiral pattern period, and decimation-by-8 may require a resolution of $1/4096^{th}$ of spiral pattern period.

Without decimation, the 4× oversampling factor results in four time base periods ($4T_{TBG}=4/f_{TBG}$) per wedge count (WCNTR) as described in above-incorporated application Ser. No. 16/715,559. With decimation, the phase of the spiral detection signal must be adjusted to keep the edges of each spiral cycle on WCNTR boundaries. Thus, for decimation-by-2, the spiral cycle will occupy two WCNTR periods. For decimation-by-3, the spiral cycle will occupy three WCNTR periods, and so on. This can be seen graphically in FIG. 5 which shows four samples 500 in every WCNTR period 550. At 501, for decimation-by-2, where only every second sample 500 is counted, it takes two WCNTR periods 550 to count four samples 511 and be ready to begin at the next WCNTR boundary. At 502, for decimation-by-3, where only every third sample 500 is counted, it takes three WCNTR periods 550 to count four samples 512 and be ready to begin at the next WCNTR boundary.

The pattern continues for decimation-by-4 at 503, decimation-by-5 at 504, decimation-by-6 at 505, decimation-by-7 at 506, and so on. Thus, at 506, it takes seven WCNTR periods 550 to count four samples 516 and be ready to begin at the next WCNTR boundary.

Figure 6:
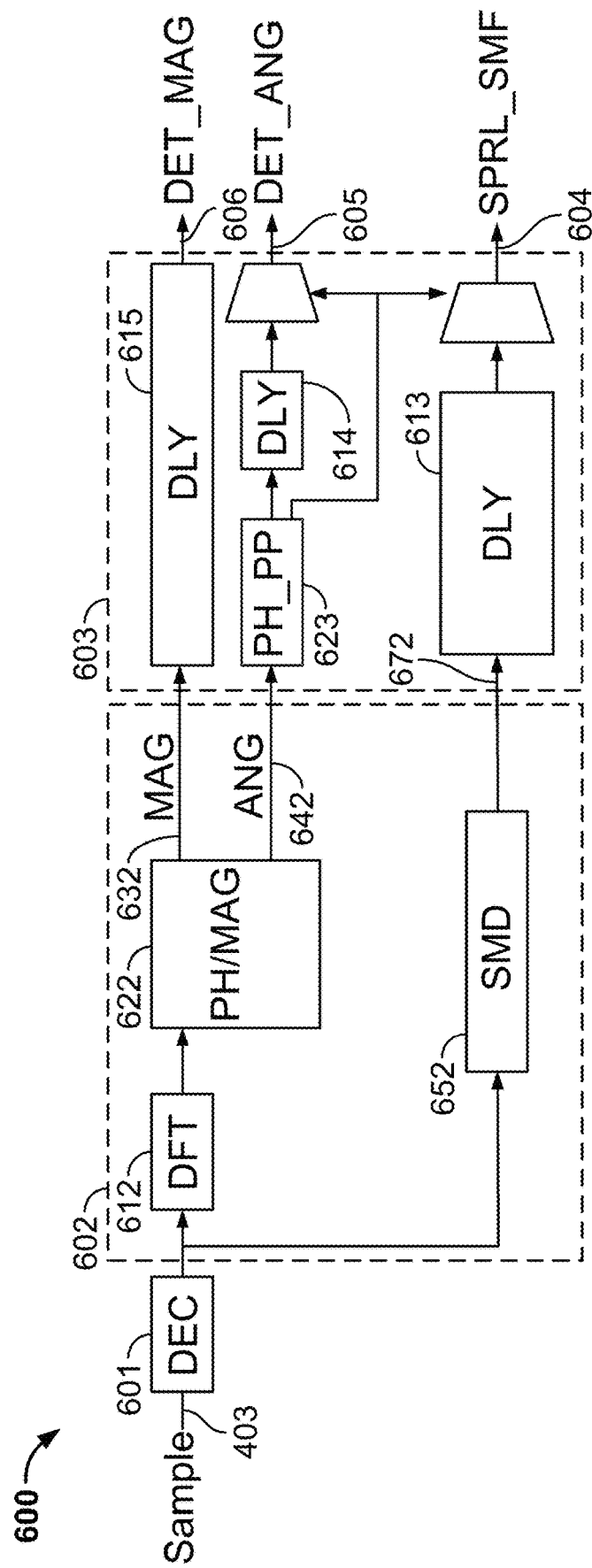
FIG. 6 is a diagram of spiral detection circuitry that may be used in self-servo-write circuitry in accordance with implementations of the subject matter of this disclosure.

The necessary phase adjustments may be carried out using an implementation 600 of spiral detection circuitry 404 as shown in FIG. 6. Spiral samples 403 are decimated at 601. Spiral detection stage 602 is similar to known spiral detection circuitry, and includes Discrete Fourier Transform (DFT) circuitry 612 and a filter 622 which derives a magnitude 632 and a phase angle 642 from DFT 612. For each respective servo wedge, sync mark detection stage 652 provides raw spiral-sync-mark-found (SPRL_SMF) signal 672.

In post-processing stage 603, magnitude 632 and phase angle 642, as output by filter 622, as well as raw SPRL_SMF signal 672, are processed under control of phase post-processor (PH_PP) 623 account for the delay introduced by decimation 601. Without decimation, phase angle 642 represents a 12-bit fixed-point fraction (ANG[−1:−12]) of which the upper nine bits are used for the time stamp phase angle DET_ANG[8:0] 605. Decimation by factor n multiplies DET_ANG by n, which adds $\log_2(n)$ most significant bits to the phase angle. Thus, e.g., decimation by 8 adds three most significant bits (n=8; $\log_2(n)$=3), resulting in a calculated angle CANG[2:−12]=ANG[−1:−12]×n. CANG[−1:−9] would be used as DET_ANG[8:0] 605 as before. Because concatenation is the same as addition, CANG[2:0] can be added by delaying raw spiral-sync-mark-found (SPRL_SMF) signal 672 at 613 by the amount CANG[2:0], to provide final spiral-sync-mark-found (SPRL_SMF) signal 604. DET_ANG[8:0] phase angle signal 605 and DET_MAG magnitude signal 606 are delayed at 614, 615 by the same amount CANG[2:0] to match the delay of SPRL_SMF signal 604.

More generally, the time base frequency is a first integer multiple of the spiral frequency. The first integer multiple is a product of the sample rate and the decimation rate, both of which are integers. The sample rate and the decimation rate may be selected so that the time base frequency is a second multiple of the servo write frequency.

The second multiple is a rational multiple. Without servo write frequency modification, the second multiple also is an integer, and is equal to the sample rate. With servo write frequency modification, the second multiple is not an integer, but is the product of the sample rate and the frequency step.

In any case, the various rates and the frequency step may be selected such that the first multiple is greater than the second multiple, meaning that the spiral frequency is lower than the servo write frequency.

Figure 7:
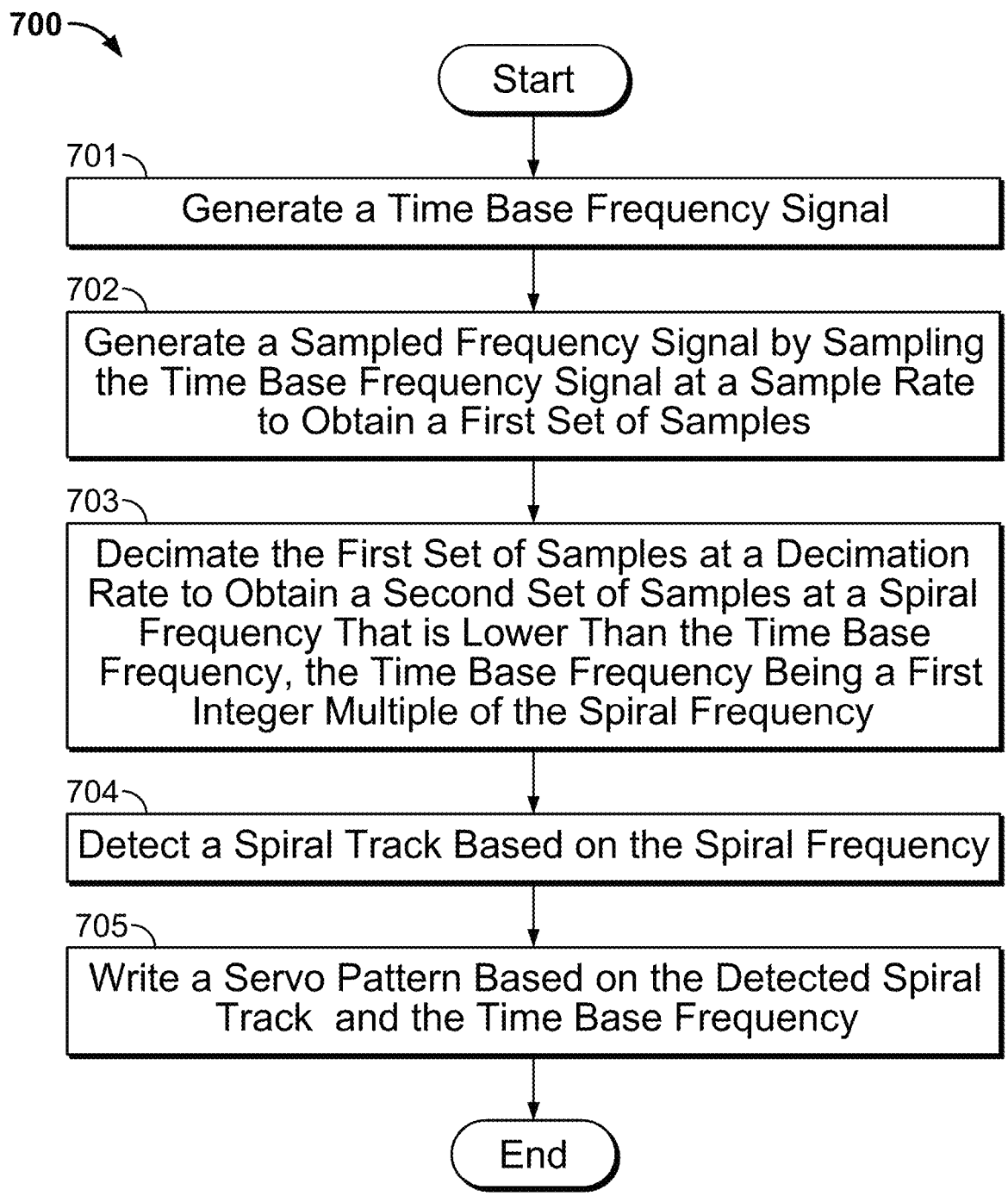
FIG. 7 is a flow diagram showing a method for spiral detection and servo pattern generation in accordance with implementations of the subject matter of this disclosure.

A self-servo-write method 700 according to implementations of the subject matter of this disclosure is diagrammed in FIG. 7. At 701, a time base frequency signal is generated. At 702, a sampled frequency signal is generated by sampling the time base frequency signal at a sample rate to obtain a first set of samples. At 703, the first set of samples is decimated at a decimation rate to obtain a second set of samples at a spiral frequency that is lower than the time base frequency, the time base frequency being a first integer multiple of the spiral frequency. At 704, a spiral track is detected based on the spiral frequency. At 705, a servo pattern is written based on the detected spiral track and the time base frequency, and method 700 ends.

Thus it is seen that a method and apparatus for reduction of jitter in the self-servo-write process, by using a single unified time base to generate the frequencies for both detection of the spiral data and writing of the servo wedge data, have been provided.

In further implementations of the subject matter of this disclosure, zoned writing as described in copending, commonly-assigned U.S. patent application Ser. No. 16/812,960, filed Mar. 9, 2020, which is hereby incorporated by reference herein in its entirety, is improved by reducing discontinuities between zones. Specifically, using the ability described herein to change the write frequency, the frequency used to write each spiral during self-servo-write of a disk being prepared for zoned servo writing can be changed "on the fly" at each zone boundary. However, during spiral detection, as the read head passes over the area where the frequency was changed during spiral writing, an error can occur because two different frequencies may be detected.

One such error, or a small number of such errors, can be tolerated by error detection and correction circuitry. However, multiple such errors can cause the self-servo-write operation to fail. Therefore, if the frequency of each spiral is changed at the same radial position—i.e., at the same track location—the read head will detect multiple errors as it passes over multiple spirals at that radial position, and the self-servo-write operation may fail.

Accordingly, in implementations of the subject matter of this disclosure, when writing spirals for zoned self-servo-write operations, the change in frequency for a given zone boundary for each spiral is performed at a different radial position from the radial position at which the frequency is changed for that same zone boundary for each other spiral. Therefore, when the spirals are detected during self-servo-write operations, the frequency detection errors at a given zone boundary will not occur one right after the other in a single pass of the read head, and therefore the operation will not fail.

Figure 8:
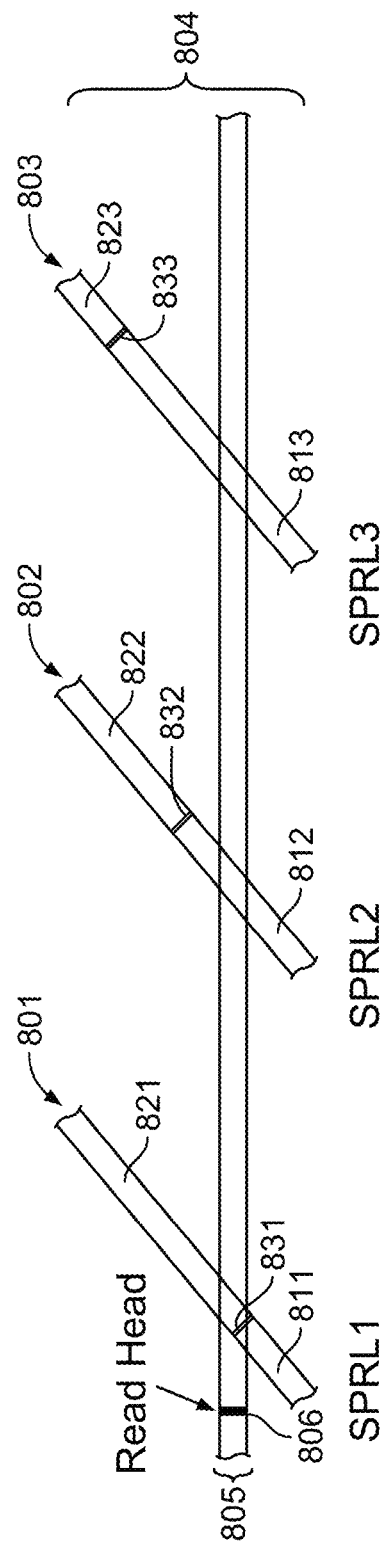
FIG. 8 shows portions of three adjacent spirals crossing the vicinity of a zone boundary on a portion of a disk storage medium.

This is shown schematically in FIG. 8, which shows portions of three adjacent spirals 801, 802, 803 in vicinity 804 of a zone boundary 805 on a portion of a disk storage medium. Each spiral 801 (SPRL1), 802 (SPRL2), 803 (SPRL3) has a respective portion 811, 812, 813 at a first frequency, and a respective portion 821, 822, 823 at a second frequency, separated by respective frequency change interface 831, 832, 833. Although all of the frequency change interfaces 831, 832, 833 lie near zone boundary 805, only frequency change interface 832 falls on zone boundary 805. Frequency change interfaces 831, 833 lie at different distances from zone boundary 805 on the same side of zone boundary 805. Thus, each of frequency change interfaces 831, 832, 833 lies at a different radial position and, on any given pass of read head 806, only one of frequency change interfaces 831, 832, 833 will be detected.

It is possible that there will be many more than three spirals on a given disk storage medium. Therefore, it may not be possible for each frequency change interface of each of the spirals to be at a different radial position from the frequency change interface of each other spiral without the frequency change interfaces being too far from zone boundary 805 to establish an effective zone boundary. However, if two frequency change interfaces must be at the same radial position, care should be taken to separate the spirals, whose frequency change interfaces share a radial position, from each other so that read head 806 does not detect too many frequency change interfaces at the same radial position too close to each other.

Figure 9:
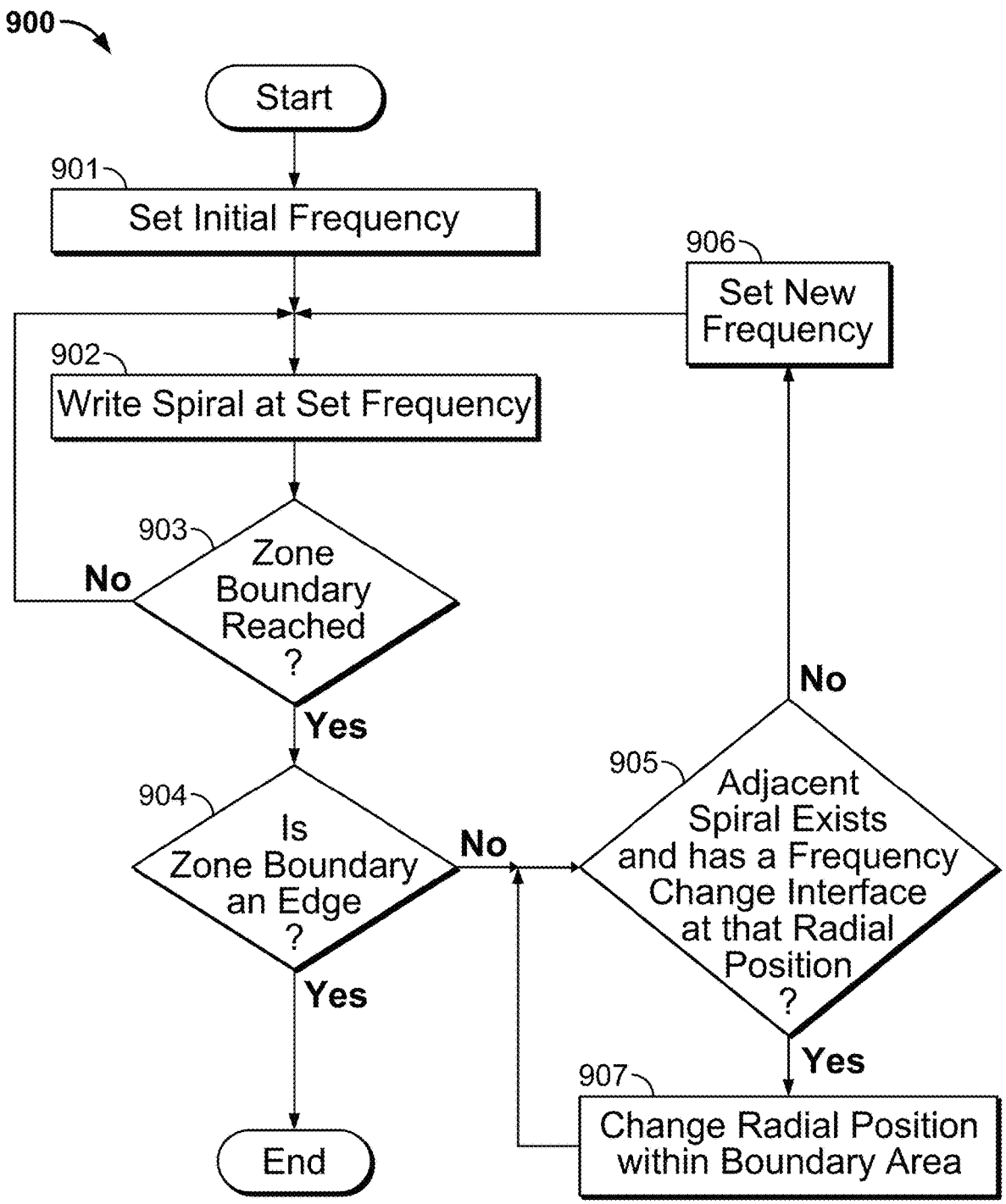
FIG. 9 is a flow diagram showing a method for zoned spiral generation in accordance with implementations of the subject matter of this disclosure.

Such a method 900 is diagrammed in FIG. 9. At 901, an initial frequency is set, and at 902 a spiral is written at a set frequency until, as determined at 903, the read head reaches a radial position in the vicinity of a zone boundary. Because there can be thousands of tracks on the disk, the vicinity of the zone boundary could be about 1,000 tracks wide—about 500 tracks on either side of a nominal boundary location. At 904, it is determined whether that zone boundary is a disk edge, and if it is, method 900 ends for the current spiral. If at 904 it is determined that the zone boundary is not a disk edge, meaning there is another zone to be written at a different frequency, then it is determined at 905 whether there is an adjacent spiral having a frequency change interface at that radial position (because this is the third or subsequent spiral to reach this radial position and a previous spiral had already had to change radial positions from the zone boundary to the current position). If not, then at 906 a new write frequency for that spiral is set (establishing a frequency change interface in the current spiral) and writing of the current spiral resumes at 902. If at 905 it is determined that there is an adjacent spiral having a frequency change interface at that radial position, then at 906 the radial position is changed to another radial position within the vicinity of the zone boundary, and flow returns to 905. Eventually, writing of the current spiral will be completed through all zones.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A self-servo-write method in a storage device, the method comprising:
   generating a time base frequency signal;
   generating a sampled frequency signal by sampling the time base frequency signal at a sample rate to obtain a first set of samples of the time base frequency signal;
   decimating the first set of samples of the time base frequency signal at a decimation rate to obtain a second set of samples at a spiral frequency that is lower than the time base frequency, the time base frequency being a first integer multiple of the spiral frequency;
   detecting a spiral track based on the spiral frequency that was obtained by decimating the first set of samples of the time base frequency signal; and
   writing a servo pattern based on the detected spiral track and the time base frequency.

2. The method of claim 1 wherein the writing the servo pattern comprises writing the servo pattern based on the detected spiral track and a servo write frequency derived from the time base frequency.

3. The method of claim 2 comprising:
   using the generated sampled frequency signal obtained by the sampling the time base frequency signal at the sample rate as the servo write frequency; wherein:
   the time base frequency is a second integer multiple of the servo write frequency.

4. The method of claim 3 comprising selecting the sample rate and the decimation rate such that the first integer multiple is larger than the second integer multiple.

5. The method of claim 2 further comprising:
   deriving the servo write frequency from the time base frequency by:
   multiplying the time base frequency by a first rational multiple, and
   sampling, at the sample rate, a signal having the multiplied time base frequency; wherein:
   the time base frequency is a second rational multiple of the servo write frequency.

6. The method of claim 5 comprising selecting the sample rate, the decimation rate and the first rational multiple such that the first integer multiple is larger than the second rational multiple.

7. The method of claim 1 wherein the detecting the spiral track comprises:
   filtering the second set of samples to yield magnitude data, and angle data including a phase angle portion and a sync mark detect portion; and
   delaying the sync mark detect portion to compensate for the decimating.

8. The method of claim 7 wherein the delaying the sync mark detect portion comprises:
   using an integer part of the angle data to generate a delay of the sync mark detect portion.

9. The method of claim 8 further comprising delaying the angle portion to maintain synchronization with the sync mark portion.

10. The method of claim 9 wherein the delaying the angle portion comprises using a fractional part of the angle data to generate a delay of the angle portion.

11. A storage device, comprising:
   a storage medium on which servo data is written using a self-servo-write operation; and
   circuitry for performing the self-servo-write operation, the circuitry comprising:
   a time base frequency signal generator;
   sampling circuitry configured to generate a sampled frequency by sampling output of the time base frequency signal generator at a sample rate to obtain a first set of samples of a time base frequency signal;
   a first filter configured to decimate the first set of samples of the time base frequency signal at a decimation rate to obtain a second set of samples at a spiral frequency that is lower than the time base frequency, the time base frequency being a first integer multiple of the spiral frequency;
   spiral detector circuitry configured to detect a spiral track based on the spiral frequency that was obtained by decimating the first set of samples of the time base frequency signal; and
   a write pattern generator configured to write a servo pattern based on the detected spiral track and the time base frequency.

12. The storage device of claim 11 wherein the write pattern generator is configured to write the servo pattern based on the detected spiral track and a servo write frequency derived from the time base frequency.

13. The storage device of claim 12 wherein:
   the write pattern generator is configured to generate the servo write frequency at the sampled frequency obtained by the sampling circuitry sampling the time base frequency signal at the sample rate; and
   the time base frequency is a second integer multiple of the servo write frequency.

14. The storage device of claim 13 wherein the sampling rate at which the sampling circuitry is configured to sample the output of the time base generator, and the decimation rate at which the first filter is configured to decimate the first set of samples, are configured such that the first integer multiple is larger than the second integer multiple.

15. The storage device of claim 12 wherein:
   the write pattern generator is configured to derive the servo write frequency from the time base frequency by:
   multiplying the time base frequency by a first rational multiple, and
   sampling the multiplied time base frequency at the sample rate; wherein:
   the time base frequency is a second rational multiple of the servo write frequency.

16. The storage device of claim 15 wherein the sampling rate at which the sampling circuitry is configured to sample the output of the time base generator, the decimation rate at which the first filter is configured to decimate the first set of samples, and the first rational multiple with which the write pattern generator is configured to multiply by the time base frequency, are configured such that the first integer multiple is larger than the second rational multiple.

17. The storage device of claim 11 wherein the spiral detector circuitry comprises:
   a second filter configured to derive, from the second set of samples, magnitude data, and angle data including an angle portion and a sync mark detect portion; and
   first delay circuitry configured to delay the sync mark detect portion to compensate for decimation of the first set of samples by the first filter.

18. The storage device of claim 17 wherein the first delay circuitry is configured to delay the sync mark detect portion by an amount derived from an integer part of the angle data.

19. The storage device of claim 18 further comprising second delay circuitry configured to delay the angle portion to maintain synchronization with the sync mark portion.

20. The storage device of claim 19 wherein the second delay circuitry is configured to delay the angle portion by an amount derived from a fractional part of the angle data.

\* \* \* \* \*